United States Patent
Brogger et al.

(10) Patent No.: US 6,309,690 B1
(45) Date of Patent: Oct. 30, 2001

(54) SYSTEM FOR RETROSPECTIVE IDENTIFICATION AND METHOD OF MARKING ARTICLES FOR RETROSPECTIVE IDENTIFICATION

(75) Inventors: Brian Brogger, Blaine; William J. Kerns, New Brighton, both of MN (US)

(73) Assignee: Microtrace, Inc., Minneapolis, MN (US)

( * ) Notice: Subject to any disclaimer, the term of this patent is extended or adjusted under 35 U.S.C. 154(b) by 0 days.

(21) Appl. No.: 09/283,174

(22) Filed: Apr. 1, 1999

(51) Int. Cl.[7] ....................................... B05D 5/00
(52) U.S. Cl. ................................. 427/7; 427/256
(58) Field of Search ................. 427/7, 197, 202, 427/203, 256

(56) References Cited

U.S. PATENT DOCUMENTS

| | | |
|---|---|---|
| 4,238,524 * | 12/1980 | LaLiberte et al. .................. 427/7 |
| 4,812,171 * | 3/1989 | Brettle et al. ...................... 427/7 |
| 5,267,756 | 12/1993 | Molee et al. . |
| 5,310,222 * | 5/1994 | Chatwin et al. ................... 283/86 |
| 5,380,047 | 1/1995 | Molee et al. . |
| 5,521,984 | 5/1996 | Denenberg et al. . |
| 5,673,338 | 9/1997 | Denenberg et al. . |
| 5,837,042 * | 11/1998 | Lent et al. ........................ 427/7 |
| 5,873,604 * | 2/1999 | Phillips ........................... 283/70 |
| 6,030,000 * | 2/2000 | Diamond .......................... 283/58 |
| 6,200,628 * | 3/2001 | Rozumek et al. ................. 427/7 |

OTHER PUBLICATIONS

Verification Technologies, Inc., Intrinsic Signature Identification System, Internet Page at www.netventure.com/vti/isis/main.htm, pp. 1–2 No date.

Total Sports Concepts, Tracercode, Internet Page at www-.totalsportsconcepts.com/Authenticity.html, pp. 1–2 No date.

* cited by examiner

Primary Examiner—Shrive Beck
Assistant Examiner—Kirsten A. Crockford
(74) Attorney, Agent, or Firm—Beck & Tysver, P.L.L.

(57) ABSTRACT

A system and method using microcoded marks provides retrospective identification of articles. An article is marked with microparticles having multiple layers. The particles form a unique spatial pattern on the article. An image is made of the mark as applied to the article. The digitized image is stored in a database with information about the article. The database can be accessed by users to verify the authenticity of an article.

15 Claims, 8 Drawing Sheets

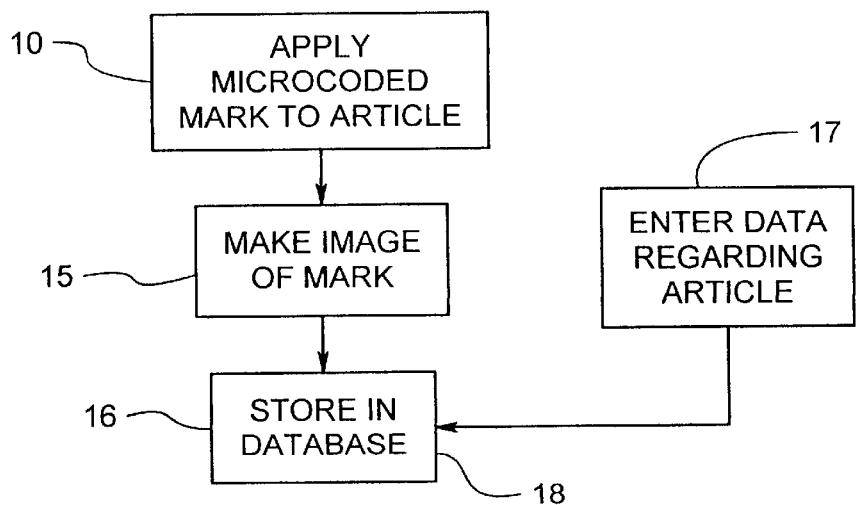
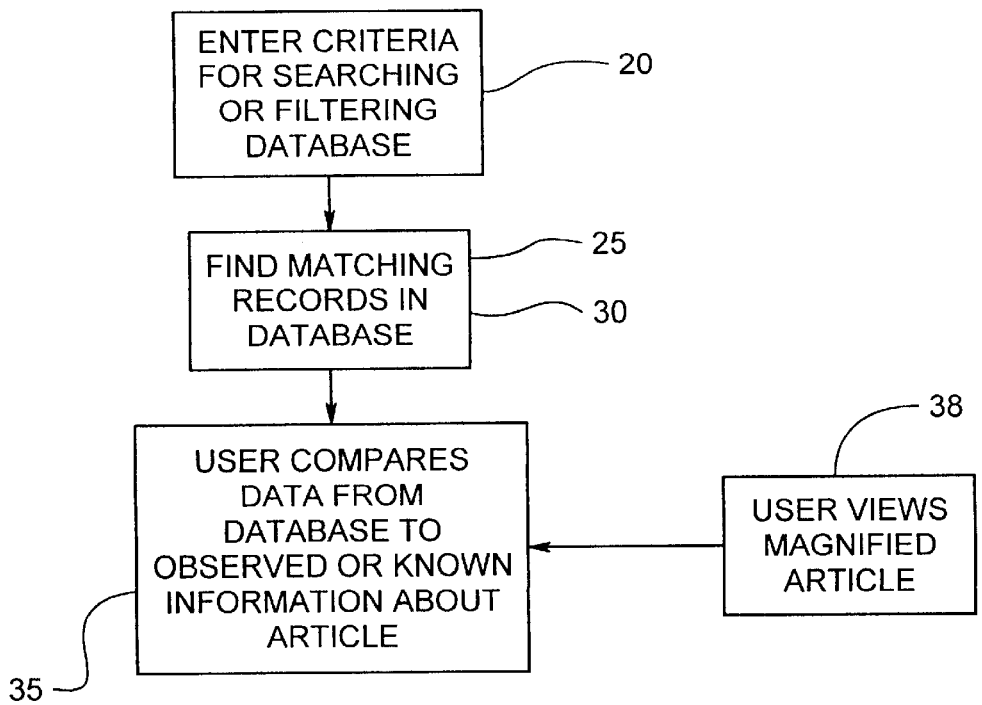

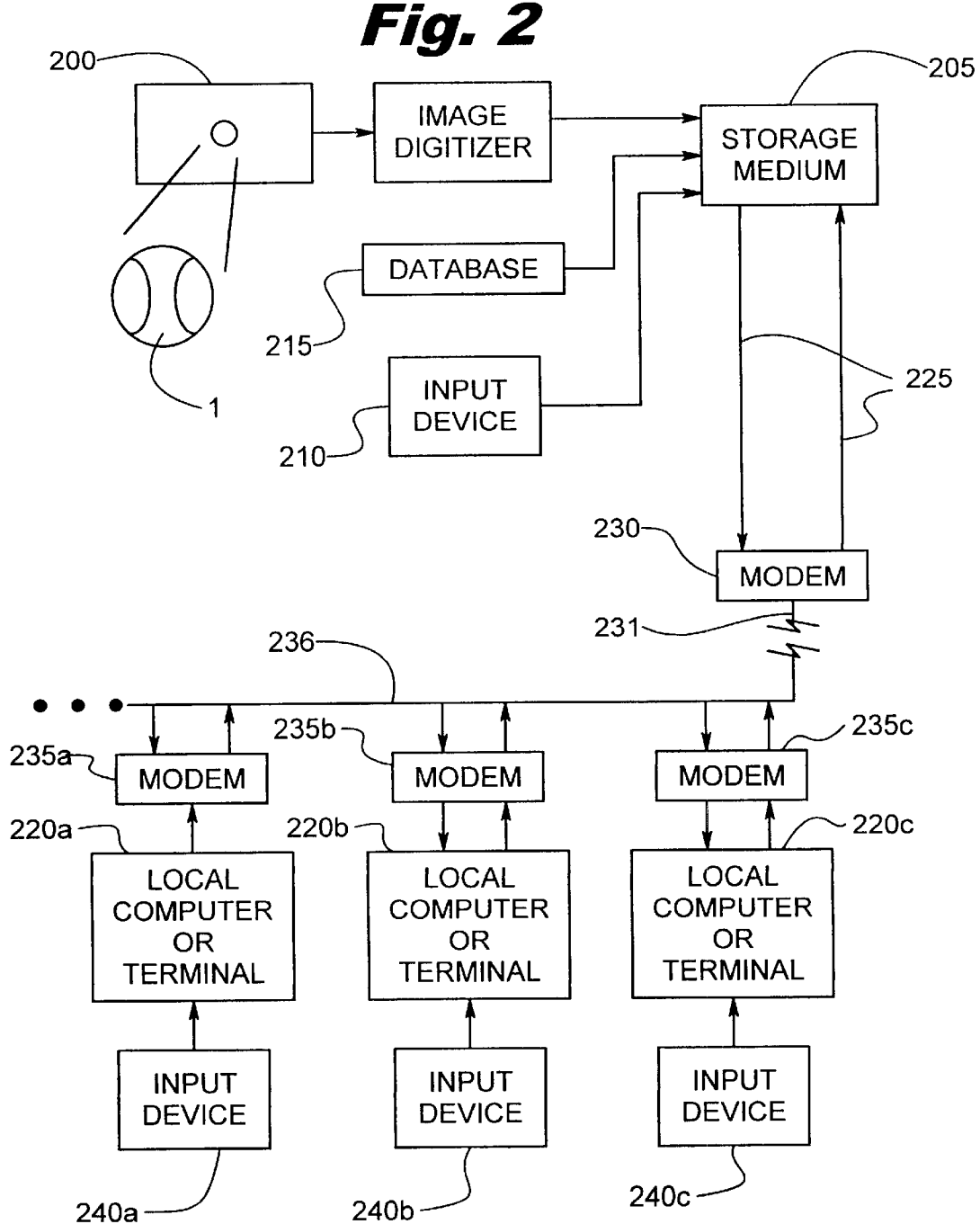

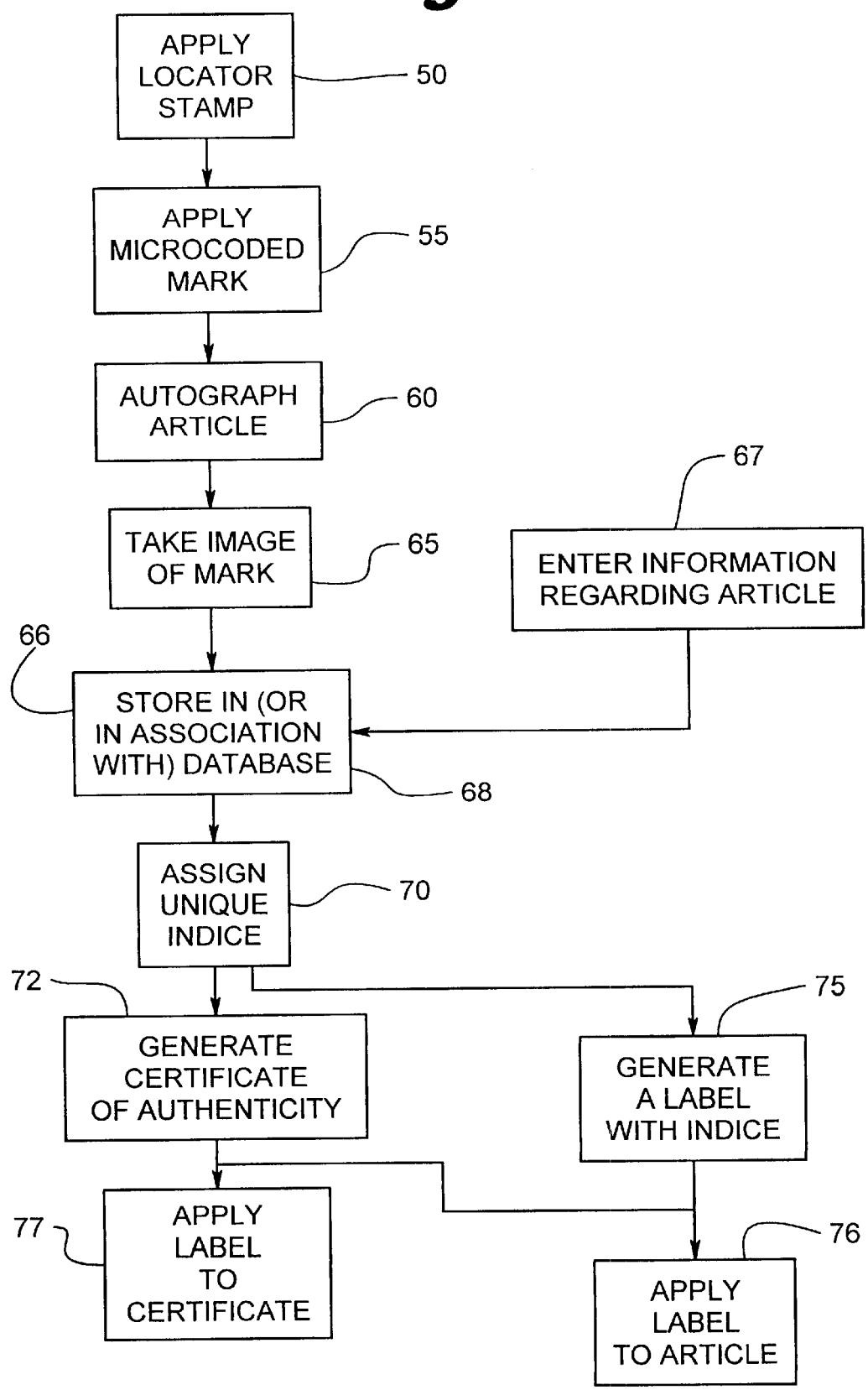

Fig. 10g
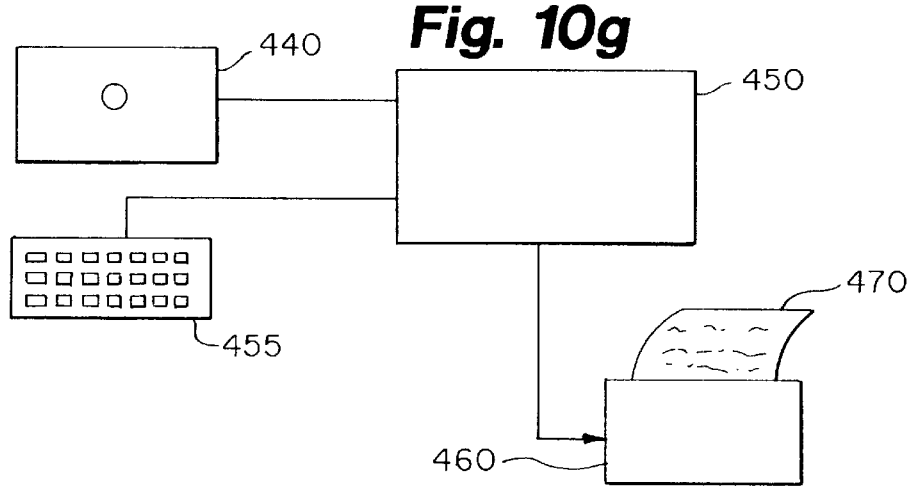
Fig. 10h
| INDICE | DESCRIPTION OF ARTICLE | WHERE SIGNED | SIGNED BY | DATE SIGNED | PURCHASER | LINK TO IMAGE | ... |
|---|---|---|---|---|---|---|---|
| 1001 | BASEBALL | METRODOME | KIRBY PUCKETT | 1/1/2000 | SMITH | X | |
| | | | | | | | |
| | | | | | | | |
| | | | | | | | |
Fig. 10i
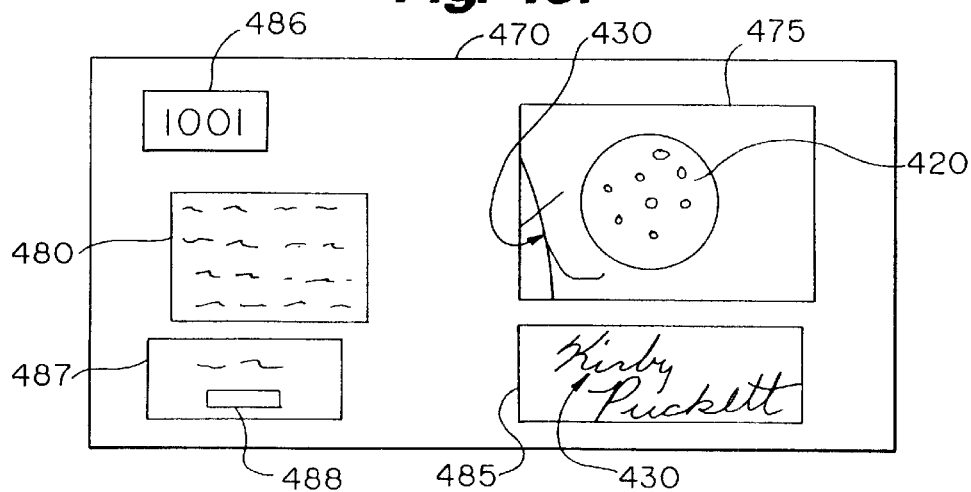

SYSTEM FOR RETROSPECTIVE IDENTIFICATION AND METHOD OF MARKING ARTICLES FOR RETROSPECTIVE IDENTIFICATION

FIELD OF THE INVENTION

The present invention relates generally to the marking of articles for retrospective identification or authentication and more particularly to systems and methods for marking an article with coded material, storing information regarding the coded material and the item on which it is affixed for later retrieval to verify the authenticity of or to identify the article.

BACKGROUND OF THE INVENTION

Authentication and identification of articles is of particular concern in the industry of sports and celebrity memorabilia. The value of a piece of memorabilia is enhanced if the prospective purchaser can be assured that the article is genuine and/or that an autograph is authentic.

Methods exist to mark items for retrospective identification. For example an authentication system, method and article are known wherein a first image-bearing medium is affixed to the article with a tamper-proof adhesive. A unique code number is imprinted on the medium. A certificate of authenticity is provided for the article and includes a second image-bearing medium with an identical unique code number. A list of unique code numbers is maintained to enable a purchaser of the article to register that article such that the purchaser or a subsequent purchaser can verify the authenticity of the authenticated article. An example of such a system, method and article is described in U.S. Pat. No. 5,380,047 to Molee et al.

What has been needed has been an authentication system with additional protections against counterfeiting and with greater ease of use and access for purchasers of memorabilia to verify the authenticity of articles they are purchasing. The system and method should be useful to verify the authenticity of the article the first time it is sold. The system and method should also be useful for purchasers in the secondary market to verify the identification or authenticity of articles for purchase. The system and method should allow the user several different methods to authenticate or identify an item.

SUMMARY OF THE INVENTION

In a preferred method according to the present invention, an adhesive or epoxy droplet with microparticles entrained therein is applied to an article or item for which retrospective identification is desired. When the adhesive dries or cures, the microparticles form a pattern. Preferably, the pattern is rendered by the shapes and sizes of the particles in the mark, the orientation of each particle in space, the concentration of the particles and the spatial relationship of the particles to one another.

In this manner, a unique mark is formed on the article that is virtually incapable of being counterfeited and which cannot be removed from the article without destroying or altering the pattern of the microparticles.

In a preferred implementation of the present invention, an image of the pattern as affixed to the article is stored in a storage medium, such as computer memory. Preferably, the image is digitized. A database links or associates a description or identification of the article to the image of the mark. The database is accessible to users through networked computers and/or via the Internet or world wide web.

Preferably, the database stores information about the purchaser of an authenticated article. A subsequent purchaser is then able to access the database to confirm the identity or authenticity of an article he/she wishes to purchase. Additionally, the database records the original purchaser of the article and is updated to record subsequent purchasers as new owners.

The system and method of the present invention can be used in conjunction with an autograph session to provide authentication for the autograph as well as the article. For example, the microcoded mark can be applied at the time of the signing, and information regarding the signing, such as the date and place, can be added to the database in association with the article. Additionally, an image of the signature itself is taken and is stored in the database in association with a description of the article. Alternatively, the signature can be made with ink having microparticles embedded therein. In this manner, the signature itself may form the unique microcoded mark. The coded signature may be used in addition to or instead of the mark applied in an adhesive drop.

Additional features and steps may be incorporated into the system and method of the present invention to offer advantage.

For example, a locator mark or stamp visible to the naked eye may be placed on the article. The unique microcoded mark is then placed in proximity to the stamp. The stamp aids in placing the mark and later in locating the mark. When the image of the mark is made, the article itself is visible in the background of the image. This further aids is verifying the identity and authenticity of the article.

In another preferred embodiment, the system includes the generation of a certificate of authenticity that bears a replicate of the image of the mark. Preferably this replicate is enlarged so that it is easily discernable to the naked eye.

In yet another preferred embodiment, an image-bearing medium or "label" can be generated to be affixed to the article. Preferably, two identical labels are generated, and one is affixed to the article and the other is affixed to the certificate of authenticity. By comparing the labels on the article and the certificate with the naked eye, the user obtains some degree of assurance that the article and certificate are related and that the article is authentic. Preferably, the labels are tamper proof or tamper evident. The labels may be of any type. A preferred label has a metal layer disposed underneath a top transparent layer. The metal layer may be selectively ablated with a laser to form a"window" (spaces where metal is dispersed), with the windows being shaped or oriented to form one or more images, such as an indicia, patterns, bar codes, or holograms, in the metal layer. Additional labels can be generated and used on packaging, the purchaser's receipt and in a variety of other ways.

In still another preferred embodiment, the system includes the assignation of an unique indice (which may be numeric, alphabetic, alpha-numeric, or of any other type) to the article and the storing of the indice in the database in association with the article. The indice can be printed on, imaged within, or otherwise applied to a label that is adhered or attached to the article at the time of authentication or signing. The indice can also be printed directly onto the certificate of authenticity. Alternatively, or in addition, the indice-bearing label may be attached to a certificate of authenticity and/or to the packaging for the article. The unique indice can be used to search the database to retrieve information regarding the associated article. The indices can be serialized or not serialized.

In still another preferred embodiment, an image is made of the celebrity's signature on the article. This image is printed or replicated on a transparent or opaque window on or associated with the certificate of authenticity. The user can align this replicated signature with the signature on the article, to get a preliminary indication as to whether the signatures match.

In another preferred embodiment, the microparticles have distinctly colored layers and the sequence of the colored layers forms a code that is assigned to a particular meaning, such as the source or identity of goods marked with the particles. The colors of the microparticles may be selected advantageously to have some common association to the article. For example, a football used in a game played by the Minnesota Vikings® or autographed by a Vikings' player might be marked with microparticles that are purple and gold, the Vikings' colors. Each particle may contain the purple and gold layers; or a mixture of purple particles and gold particles can be used.

In another preferred embodiment, an outer layer of the microparticles bears characters. Preferably these characters are microscopic and repeating and are selected or assigned to a particle meaning. For example, the letters "MV" might be used for Minnesota Vikings articles. The presence of the letters will assist in retrospective identification. Additionally, when the microparticle is viewed under magnification, these characters will aid in discerning the spatial pattern formed by the microparticles. For example, the characters themselves, the orientation of the lettering, and the way that characters are fragmented by the edges of the microparticles are all features that will aid in the recognition of a pattern of microparticles.

In a preferred embodiment, energy-sensitive materials, such as thermochromic or photochromic materials, may be used for one or more of the layers. In another preferred embodiment, near-infra-red-frequency material is used in the microparticle.

These preferred embodiments enable a variety of methods of "interrogating" the microcoded marks to confirm the authenticity of the article. Some of the embodiments include labels that can be viewed and compared with the naked eye. Other embodiments require exposure of the mark to an energy stimulus, such as temperature changes or light of particular frequency. Other embodiments involve accessing a database and comparing information.

These preferred embodiments enable varying degrees of security against counterfeit. For example, a metal-ablated layer is likely more difficult to counterfeit than a printed label.

The system is easily and effectively incorporated into a system for selling memorabilia on-line. Currently one problem with purchasing memorabilia through the Internet is that there is limited ability for the prospective buyer to assess the authenticity of the article and the credibility of the seller. By combining the system and method of the present invention with on-line sales, the purchaser can shop for and confirm the authenticity of articles from their home computer.

BRIEF DESCRIPTION OF THE DRAWINGS

An exemplary version of a microcoded mark and a system and method for authenticating articles is shown in the figures, wherein like reference numerals refer to equivalent structure throughout, and wherein:

FIG. 1a is a flow chart illustrating steps for gathering and storing data in an authentication system and method according to the present invention;

FIG. 1b is a flow chart illustrating further steps for retrieving and using data in an authentication method according to the present invention;

FIG. 2 is a schematic representation of an authentication system according to the present invention;

FIG. 3 is a flow chart illustrating steps for gathering and storing data in another embodiment of an authentication system and method according to the present invention;

FIG. 9b is a side elevational view of the label fo FIG. 9a; and

FIGS. 10a–i is a depiction of an example of a system and method for authenticating articles according to the present invention.

DETAILED DESCRIPTION OF THE PREFERRED EMBODIMENT(S)

Figure 4:
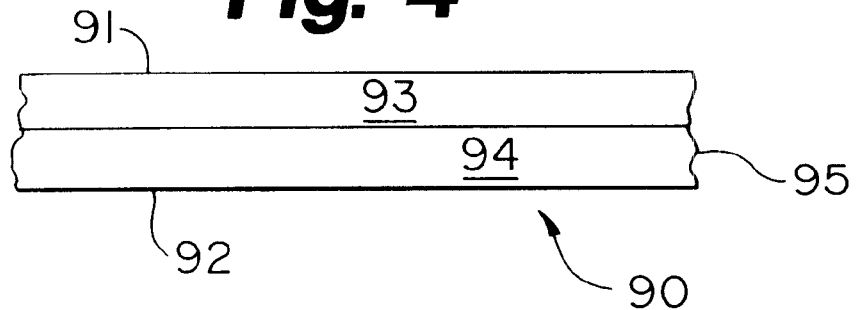
FIG. 4 is a an enlarged side view of a microparticle used in accordance with the present invention.

In a system and method according to the present invention illustrated by flow charts in FIG. 1a, an article is marked with microcoded particles 10. An image is then taken or made 15 of the microcoded particles. That image is stored 16 in a storage medium such as a database stored on a computer disk or hard drive. Data regarding the article is entered 17 and stored 18 in the storage medium in association with or linked to the image.

The database is accessible for later retrieval of data about the article. Preferably, the database is accessible to users through networked computers, such as via a web site on the internet. Alternatively or in addition, purchasers can access the database through kiosks located in a retailers' store. As illustrated by the flow chart in FIG. 1b, a user enters a search or filter criteria 20 into a computer in connection with the database, the database identifies a matching record(s) 25 and returns to the user stored information about the record searched 30. The user compares 35 this information with information otherwise known about the article. For example, the user may be able to view the microcoded particles on the article under magnification 38 and may then compare the pattern to the image returned by the database to determine if the article is authentic.

This process shown in flow-chart form in FIGS 1a and 1b is illustrated schematically in FIG. 2. An image-acquiring device 200 makes an image of an article 1 to be authenticated. The image is digitized by the image-acquiring device 200 or by a separate digitizing device. The image is stored in a storage medium 205, such as a computer hard drive.

Data about the article is entered through a data input device 210, such as a computer keyboard. The keyboard 210 and the image digitizer 200 are in communication with a storage medium 205 and the data entered and the image are stored in a database 215 in the storage medium in relation to one another. The database 215 is connected to local computers 220a–c through a data transport connection 225. One arrangement for data transport connection is illustrated. The database 215 is connected via a modem 230 and phone lines 231 to local computers 220a–c connected to modems 235a–c and phone lines 236. The local computers 220a–c have data input devices 240a–c, such as computer keyboards. Those of skill in the art will recognize that computers can be networked through means other than modems and phone lines. Examples of currently known methods include satellite and direct hardwiring.

In another embodiment of a system and method according to the present invention, illustrated in the flow chart of FIG. 3, additional steps and features are included to further aid in the retrospective identification or verification of an article. An article 1 is stamped or marked 50 with a locator mark or indicator. Proximate to the locator mark, a microcoded mark is applied 55 to the article. In some instances, it is advantageous to apply a subsurface on a small portion of the article's surface and then to apply the microcoded mark on top of the subsurface. The use of a subsurface area is advantageous where, for example, the article's surface is shiny and will produce a glare during the process of making an image of the mark.

The article is then autographed 60 in proximity to the locator mark. An image is made or taken 65 and is stored 66 in a storage medium such as a database stored on a computer disk or hard drive. Data regarding the article is entered 67 and stored 68 in the storage medium in association with or linked to the image. Each record in the database corresponds to one article. A unique index number, indice, or serial number is assigned 70 to each record or article and this indice is stored in the database in connection or association with the article.

A printer, in communication with the database, prints 72 a certificate of authenticity which bears information from the database record relating to the article. Preferably the certificate bears a magnified image of the microcoded mark. Additionally, an image of the certificate of authenticity itself may be stored in the database.

The system advantageously can incorporate labels. In one embodiment, a label is generated 75 bearing a unique indice. The label is then attached to an article and/or to the certificate of authenticity 77. The unique indice is assigned to the article on which the label is placed, and this information is stored in the database. Alternatively, the process happens in the opposite order, i.e. a unique indice is assigned to an article, and then a printer prints or otherwise generates a label bearing the unique indice. The label is then attached to the article. With either labeling method, preferably at least two labels per item are generated, with each label bearing the unique indice assigned to the item. With either labeling method, additional labels may be generated for additional purposes, e.g. a label bearing the item-specific indice may be attached to packaging of the article and/or such a label may be attached to the purchaser's receipt. Labels attached to packaging may bear additional information, such as a bar-coded serial number, particularly for use in conveniently tracking items prior to purchase. The labels are preferably tamper proof or tamper evident.

This system offers particular advantage for verifying or authenticating autographs on memorabilia. The database can be used to store information regarding the occasion of the signing as well as information about the article itself.

Additional features and steps may be used in conjunction with the system and method of the present invention. For example, when an image is made of the microcoded mark, an image may also be taken of an autograph itself. The image may be distinct from or part of the image of the microcoded mark. The autograph image is available for retrospective viewing and comparison to the signature on the article. Further, the system can provide for a replicate of the signature to be printed on the certificate of authenticity. Most preferably, the autograph is replicated on a transparent or translucent window on the certificate in actual size, so that retrospectively a user can physically place the certificate on top of the article and visually compare the signatures.

The system and method described above incorporate a variety of features for aiding in the authentication process. To a considerable degree, the features may be selectively applied and mixed-and-matched to achieve a level of protection that is suitable for a particular application.

The Microcoded Mark

The use of microparticles for the retrospective identification of articles is known from U.S. Pat. No. 4,053,433 and 4,390,452, incorporated herein by reference, and from other sources. Such particles may be used for the identification of a wide variety of items. Each microparticle includes a sequence of visually distinguishable dyed and/or pigmented layers. The microparticles are "coded" in the sense that particular color sequences in the particles are assigned to a particular meaning, such as the source of the item on which the particles are placed. Typically, microparticles are not "readable" to the naked eye, i.e. the particles must be magnified for the layer sequence to be discerned.

FIG. 4 shows a microparticle 90. The particle 90 has top and bottom surfaces 91 and 92, with two or more layers 93, 94 therebetween. An edge 95 extends between the top and bottom surfaces and circumscribes the particle. The edge 95 is generally irregular. While the depicted microparticle has only two layers, the microparticle may contain any number of layers.

In a preferred embodiment, energy-sensitive materials, such as thermochromic or photochromic materials, may be used for one or more of the layers. An energy-sensitive material has different optical properties under different conditions. For example, a thermochromic material is transparent in one temperature range, but opaque outside of that range. Photochromic material is transparent under light of a range of frequencies, but opaque when exposed to light outside of that range of frequencies. Use of energy-sensitive material for all of the layers aids in making the microcoded mark covert. That is, if the layers are of thermochromic material having the property of being transparent at room temperature, and if the particles are entrained in a generally transparent adhesive or epoxy, then the microcoded mark will be generally covert at room temperature. The mark and the sequence of its colored layers can be revealed by exposing the mark to an elevated or decreased temperature, depending upon the predetermined properties of the thermochromic material.

In another preferred embodiment, near-infra-red-frequency material is used in the microparticle. Such material flouresces when exposed to infra-red light. Use of this material aids in making the microcoded mark covert. Currently, known infra-red materials lose their responsiveness over time upon exposure to UV light. Therefore, in a preferred embodiment of these microparticles, a near-infra-red-frequency layer is covered by or sandwiched between energy sensitive layers that are opaque at typical indoor ambient temperatures to protect the near-infra-red material from exposure to UV light under typical temperature conditions, thereby prolonging the life of the near-infra-red material.

In another preferred embodiment, magnetic materials are used in the microparticle.

Figure 5:
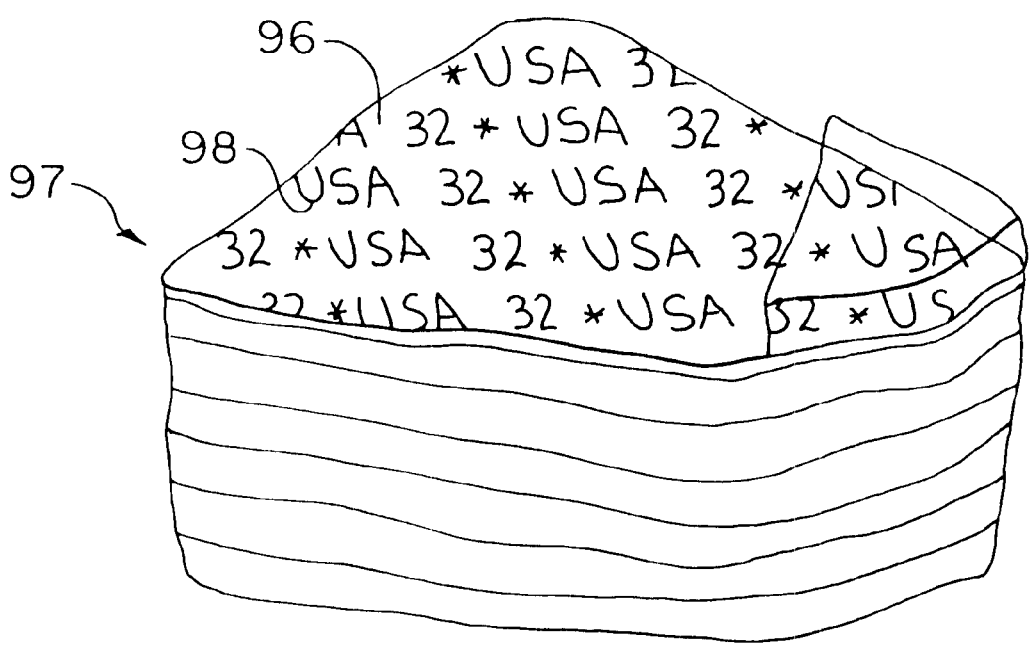
FIG. 5 is an enlarged perspective view of an embodiment of a microparticle used in accordance with the present invention.

In another preferred embodiment, illustrated in FIG. 5, an outer surface or visible layer 96 of the multi-layered microparticle 97 bears indicia 98, such as alpha-numeric characters, patterns, abstract images or the like. The indicia are preferably registered. A typical method of forming microparticles bearing indicia yields slightly recessed indicia. Such a method involves laser etching of the indicia onto the outer surface of the microparticles. Another such method is described in U.S. Pat. No. 4,390,452. To enhance the visibility of the recessed indicia, the method may also include a step of applying a curable ink to the indicia-bearing surface, wiping the ink away, leaving ink settled in the recesses, while leaving the un-recessed area substantially ink-free. When a curable ink is used, the particle can then be cured, and the ink will solidify and the ink-filled indicia are then more easily discernable. For example, inks that cure upon exposure to ultraviolet can be used.

Figure 6:
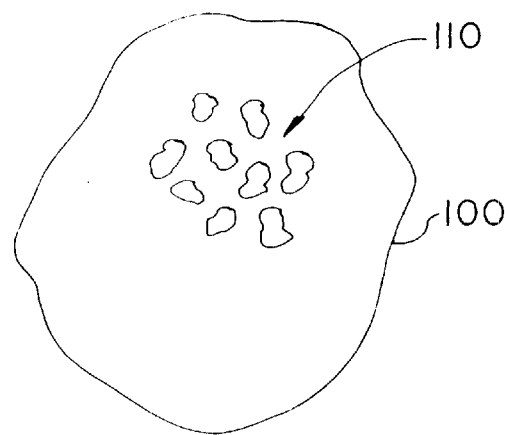
FIG. 6 is a top elevational and enlarged view of a pattern of microcoded particles in accordance with the system and method of the present invention.
Figure 7:
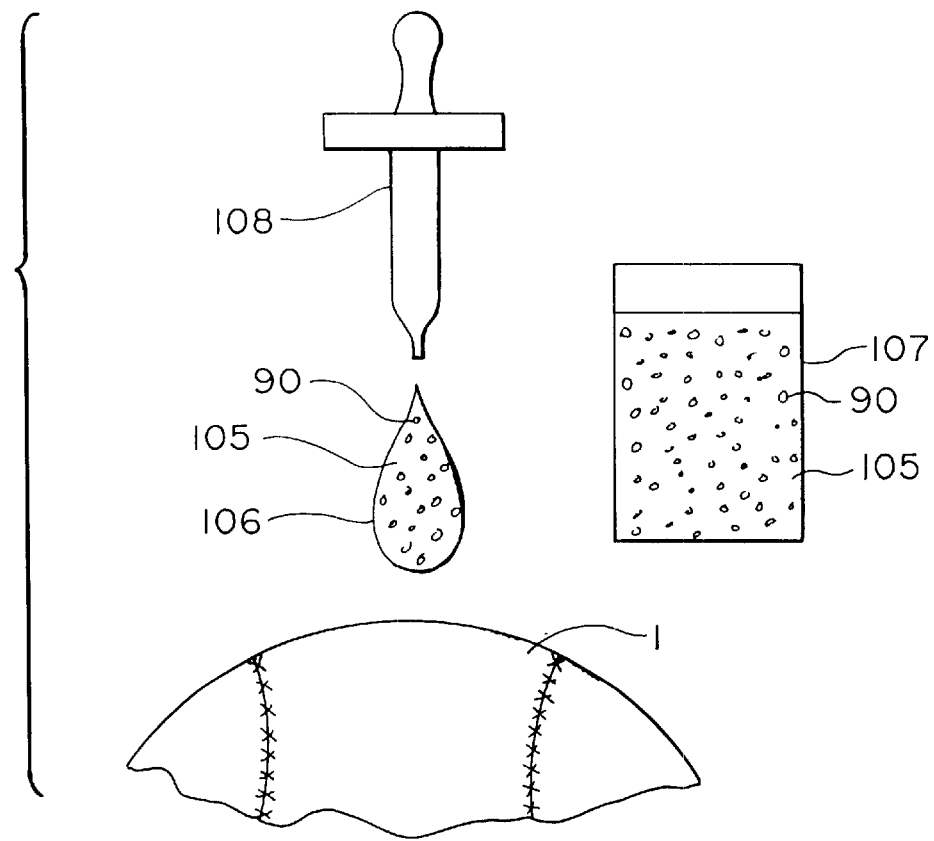
FIG. 7 is a depiction of an application of microcoded particles to an article in accordance with the system and method of the present invention, with the microcoded particles and the droplet in which they are entrained exaggerated in size.
Figure 8:
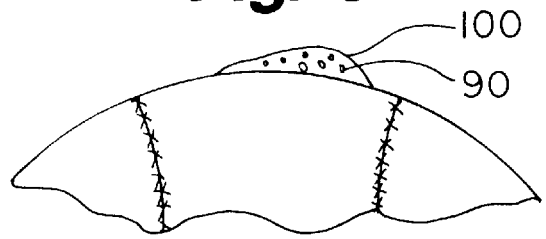
FIG. 8 is a side elevational and enlarged view of an article bearing microcoded particles in accordance with the system and method of the present invention.

As shown in FIGS. 6–8, a microcoded mark 100, as used in conjunction with the system and method of this invention, is a random configuration of multiple microparticles. Preferably, the mark 100 is applied in such a way that it forms its unique pattern as the mark is applied. This is accomplished in a variety of ways within the spirit of this invention. For example, as illustrated in FIG. 7, microparticles 90 are entrained or dispersed in a liquid 105. Suitable liquids include adhesives, epoxies and the like. Most preferably, microparticles 90 are entrained in a transparent adhesive such as plastisol, optical adhesives such as those produced by Norland, and solvent-based lacquers. A droplet 106 of the adhesive/particle mixture is drawn from a pre-mixed volume 107 of the mixture and applied to an article 1 with an eye dropper 108 or other suitable applicator. As shown in FIG. 8, the droplet 106 attaches to the article 1 and dries or solidifies, forming the microcoded mark 100. FIG. 6 illustrates the top view of such a mark 100. The microparticles are randomly and uniquely arranged in a pattern 110, and this pattern 110 does not form and does not exist until the mark 100 is applied to the article. The pattern 110 is rendered by the orientation of each of the particles, by the spatial relationship of each particle to the others, by the colors and shapes of the particles. If the particles bear indicia, the orientation of the letters and their fragmentation provide additional landmarks for visual comparison and they contribute to the pattern 110. The pattern is disrupted or destroyed if the mark is removed from the article.

Figure 9A:
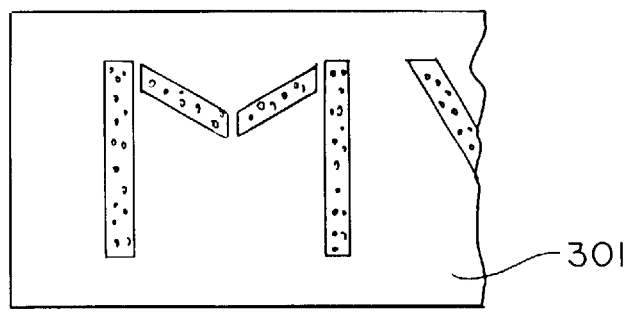
FIG. 9a is a top elevational view of a fragment of a label having microcoded particles embedded therein for use in conjunction with the system and method of the present invention.
Figure 9B:
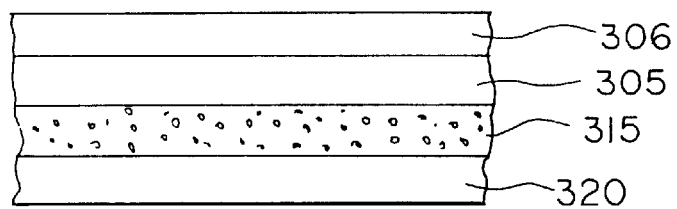

In an alternate embodiment, microcoded particles are incorporated into or embedded in one or more layers of a label, and the microcoded particles are applied to an article by application of the label to the article. The spatial pattern formed by the microcoded particles will be unique and can be scanned, digitized, stored and "interrogated" in the same manner as the pattern formed by the adhesive droplet embodiment discussed above. As illustrated in FIGS. 9a and 9b, a preferred label 301 for this embodiment has a metal layer 305 disposed underneath a top transparent layer 306. The metal layer 305 may be selectively ablated with a laser to form one or more "windows" 310 (space where metal is dispersed), exposing microcoded particles 315 embedded in an adhesive layer 320 underneath the metal layer 305. Additionally, the window 310 or a series of windows can be shaped or oriented to form one or more images, such as an indicia, patterns, bar codes, or holograms.

The "code" of the microparticles aids in the retrospective identification of the article because a particular code can be assigned to a specific event, such as an autograph signing session. For example, a six-layer code having a color sequence of red, green, blue, red, blue, white may be assigned to a baseball signing on Jan. 1, 2000. The code is retired, and particles bearing this sequence will not be used in a conflicting manner. Retrospectively, the microcoded mark can be viewed under magnification and, using information stored in a database, matched with the information relating to that particular color sequence revealing that the article is a baseball that was signed on Jan. 1, 2000.

Alternatively, a particular code can be assigned to an organization. For example, microparticles containing layers of colors associated with a particular team may be assigned for use by that team for its memorabilia.

Alternatively, combination of these two coding scenarios can be used. A code can be assigned for a Minnesota Timberwolves signing on Jan. 1, 2000 that corresponds to the six-layer color sequence blue-green-black-blue-green-black. The code green-blue-green-blue-green-black can be assigned for a Timberwolves signing on Feb. 1, 2000. In this manner, the colors used provide some meaning (that the article was signed at a Timberwolves event) and the particular sequence provides a more specific level of meaning (the particular dates of the signings).

Further, as described above, the pattern of the microparticles, which is unique to each article, provides additional and more specific information about the article, such as the current owner. Additionally, the background of the particles is the article itself which further aids in the identification and authentication of the article.

In another method of applying the microcoded mark to an article, microparticles are entrained in ink. The ink is used to stamp the article, or is used in a writing instrument to write on the article. Such a writing instrument is advantageously used to sign the autograph. As with the adhesive droplet method illustrated in FIG. 4, a unique microcoded mark forms when the ink dries on the article.

In another method of applying the microcoded mark, microparticles are sprinkled, in their dry particulate form, onto the article. A tape or label, preferably transparent or having a transparent window, is placed over the particles to secure them in a unique pattern.

Verifying the Authenticity of Marked Articles

The system and method described herein and its many embodiments provide for a variety of ways for a user to verify the authenticity or source of a marked article. Those of skill in the art will recognize that the following lists are exemplary and illustrative only; they are not intended to exhaust the numerous possibilities for interrogation made possible by the system and method of the present invention and additional features and methods described herein. For example, the naked eye can:

discern the presence of a locator stamp and confirm that its stylized logo is accurately depicted;

compare the signature on an article to a signature replicated on a certificate of authenticity;

compare information printed on a certificate of authenticity to information in a central database as accessed through the Internet;

confirm that the microcoded mark has not been tampered with;

observe the article itself and confirm that the background of images on the certificate of authenticity and on the database are congruent;

compare the identity of a prospective seller with the owner information available on the database;

confirm that the label has not been tampered with;

compare the labels on the article and/or its packaging to the label on the certificate of authenticity;

compare the indice on the label with the indice in the database and compare the article to the description give by the database for the article with the indice; By magnifying the microcoded mark, the user can;

compare the spatial pattern formed by the microparticles on the article with the enlarged image of the mark on the certificate of authenticity and in the database as accessed through networked or linked computers;

observe the colors used in the microparticles and observe the sequence of the colored layers and confirm that this the code sequence matches the information in the database and/or on the certificate of authenticity;

observe characters on the face of the microparticles to confirm that these match the information in the database and/or on the certificate of authenticity;

compare the magnified background behind and surrounding the microcoded mark to the magnified background image on the certificate of authenticity and/or in the database;

Additionally, appropriate mechanical or optical readers can be used to "interrogate" and interpret a mark and to compare it to the stored pattern. More specifically, a method of identifying an object for retrospective identification involves distributing a set of microparticles on an external surface of an object, with each of the microparticles having a machine discernible feature. A fiducial marking on said external surface is proved. A scanner is positioned with respect to said fiducial marking and the surface is scanned to generate a unique signature that is a function of the unique spatial locations of said microparticles on said surface.

If the microcoded particles contain near-infra-red materials, a mechanical reader will provide near infra-red light and will sense the resulting fluorescence. Because of the varying concentrations of the near infra-red material in the particles, the strength of the response will vary and can be used to create a histogram. This histogram can be used to generate a single digital reading that can be paired with the visual color identification and stored on the database for later reference. Similarly, for microparticles containing magnetic materials, a mechanical reader will supply a magnetic field and detect response variations in the particles and generate a profile of the particle pattern.

For microcoded particles containing thermochromic materials, a heat or cooling source is used to cause the microparticles to change color. This color can then be read under magnification by the eye or mechanically by a device that senses color.

Selling Articles Through Networked Computers

The system and method of the present invention can be advantageously used for selling or shopping for authenticate articles through the internet. An electronic marketplace provides a site for sellers to post articles for sale. The host of the site will preclude articles from being posted on the site unless the authentication database confirms that the person offering the article for sale is the registered owner.

In a preferred embodiment, the owner/seller of an article that is already registered in the authentication database visits a web site ("article verification site") provided by a host. The host has access to the authentication database. The site allows the owner to enter, for example, the unique indice assigned to the article and the owner's identity. The host downloads or "reads" the owner's input, compares the information provided by the owner with the information stored in the authentication database. If the information matches, the host places the article on sale on a web site for sales. (The sales site may be the same or different from the article verification site.) Prospective purchasers can browse the sales site, preferably with searching capabilities, to find an article to purchase. To purchase an article, the purchaser selects an article. To register his/her name as the new owner, the purchaser submits identifying information which is then relayed by the host to the authentication database to update its owner information for the article.

The site can facilitate payment and fulfillment. Fulfillment can be achieved in a number of ways. For example, the host and site can function like a classified ad, where the host never takes possession of the article, but rather just provides the buyer and seller with enough information about one another that they are able to contact each other. The buyer and seller then arrange for the exchange of the article. Alternatively, the host can receive the property from the seller and forward the article to the buyer.

In either case, or in any other fulfillment arrangement, the system preferably provides for payment by the seller on-line. The site allows the purchaser to submit information to process a payment (such as credit card information). Preferably, the host is in electronic communication with a credit card processing service, and preferably the payment is processed electronically and automatically upon entry by the purchaser.

EXAMPLE

Here follows one example of the use of the system and method of the present invention. The example incorporates a variety of complimentary features to aid in the authentication and verification of an article.

Figure 10A:
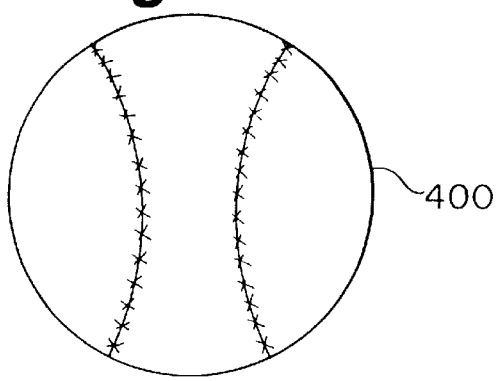
Figure 10B:
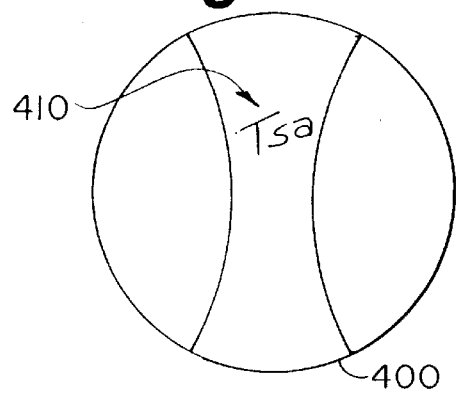
Figure 10C:
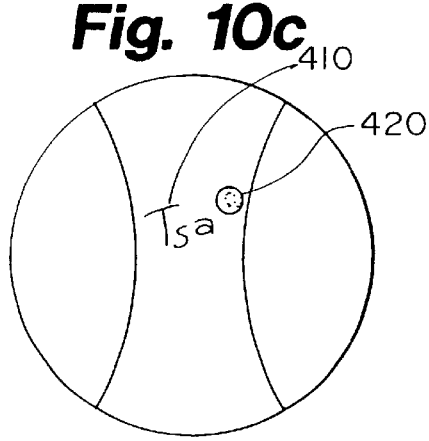
Figure 10D:
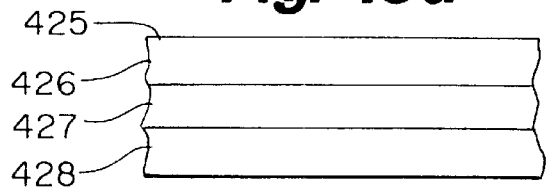

An autograph signing event is organized at which Kirby Puckett, famous as a former Minnesota Twins outfielder, will sign baseballs for fans on Jan. 1, 2000 at the Hubert H. Humphrey Metrodome in Minneapolis, Minn. The event organizer purchases 500 baseballs for the signing. As illustrated in FIG. 10b, each of these 500 baseballs 400 are stamped with a locator mark 410 that is noticeable to the naked eye. The locator mark 410 is a stylized logo ("TSA" in the illustrated example). At the signing, each baseball 400 is marked with a droplet of adhesive material 420 having coded microparticles 425 entrained therein as depicted in FIG. 10c. The adhesive droplet 420 is applied proximate to the locator mark 410. As shown in FIG. 10d, the microparticles 425 have colored layers 426, 427, 428 in the sequence of red and blue with a white layer therebetween, the colors of the Minnesota Twins. This sequence has been assigned to this particular signing, i.e. it is used exclusively to mark the 500 baseballs being signed at this signing. The code is retired and will not be used for another conflicting purpose.

Figure 10E:
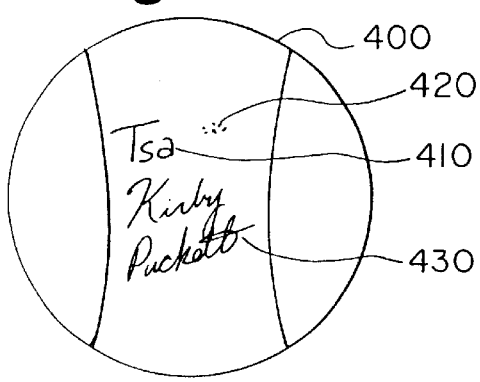
Figure 10F:
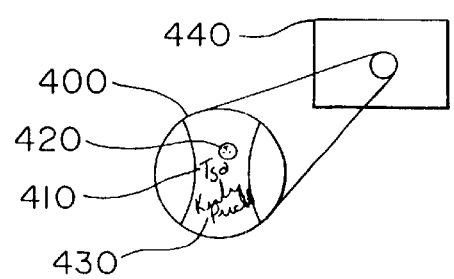

When the mark dries or solidifies, the microparticles form a unique pattern. Mr. Puckett signs the baseball in proximity to the locator mark, as illustrated in FIG. 10e. An image is taken of the microparticle pattern, FIG. 10f. Additionally, an image is made of the signature 430 itself. The baseball is visible in the background of the microparticle image or in the area surrounding the particle pattern. The image is taken with a digital imaging device 440 and is stored in a computer database 450. Data regarding the signing is entered via a keyboard 455 and stored in the database in association with the image, FIG. 10g. The table 456 representing the database 450 is illustrated in table form in FIG. 10h. For this exemplary signing, the image is associated with the following data: that the signing was made by Mr. Puckett on Jan. 1, 2000 at the H.H.H. Metrodome in Minneapolis, Minn., that the article signed is a baseball, that the baseball is one of 500 signed on that occasion, and the name and identifying information of the purchaser Smith. The indice 1001 is assigned. As illustrated schematically in FIG. 10g, the database 450 is in communication with a printer 460 which prints a certificate of authenticity 470 for the purchaser of the baseball. The certificate 470, illustrated in FIG. 10i, bears a magnified image 475 of the microparticle pattern, printed information 480 regarding the baseball (e.g. date and place of signing, name of autographer, the name of the purchaser) as pulled from the database, and a transparent window 485 with a replicate of Mr. Puckett's signature 430 printed thereon. In addition, the database assigns a first unique index identifier or indice 486 to the article, and this indice is printed on the certificate. A label bearing a second unique indice (which may match the first indice or may be a different indice assigned to this article and entered into the database in association with the first indice) is attached at the signing to the article or its packaging. A matching or related label 487 bearing the same second indice 488 is attached to the certificate of authenticity 470. Thus, the purchaser of the baseball receives the ball which bears a locator stamp, a patterned microcoded mark, Mr. Puckett's signature, and a label bearing an indice. The purchaser also receives a certificate of authenticity which bears a magnified image of the microcoded mark, an indice that matches that on the ball, a replicate of the signature on the ball, and information about the ball and the occasion of its signing including the purchaser's name.

The database is accessible via the Internet to users to look up information about logged articles. Thus, if the purchaser (P) wishes to sell the ball to a subsequent purchaser (SP), SP can verify the authenticity of the ball by entering the indice and viewing information from the database. SP can use his/her home/work computer or SP can visit a kiosk-like arrangement at a retail store or collectors' convention. The database will show that P is the registered owner. If P provides SP with a copy of the certificate and/or shows the ball to SP, SP will find that all of the information coincides with the information SP retrieves from the on-line database. By viewing the microcoded mark under magnification, SP will see that the pattern of the particles matches the image in the database. When SP purchases the ball, he/she will register his/her name with the service maintaining the database so that SP's name is listed as the current owner of the ball.

Although an illustrative version of the method and system is described below, it should be clear that many modifications to the method and system may be made without departing from the scope of the invention as expressed in the appended claims.

Throughout this description, the following terms include the meanings ascribed to the terms by those of ordinary skill in the art and includes meanings now understood and those yet to be discovered or applied; the terms include, but are not limited to, at least the following illustrative meanings:

Data means textual, graphic, symbolic or any other information.

Input device includes a keyboard, mouse, track ball, touch-sensitive screen, touch-sensitive cursor or mouse pad, or voice receiver and recognition apparatus/software.

Storage medium means any method of storing information for later use, particularly in connection with digitized information, including but not limited to a floppy disk, a hard drive, digital tape, and compact disk.

Network means any connection between two computers by which one computer can send or access information stored on another computer, including but not limited to hard-wired connection, modem/phone line connection, modem/satellite connection, and RF connection.

Database means an organization and storage system for records, wherein one or more pieces of information are stored for each record.

Indicia or indice means numeric characters, alphanumeric characters, Roman numerals, abstract images, code, patterns and the like. Indices may be serialized or not serialized.

Label means an image-bearing medium, whether optical or mechanical, including but not limited to paper, foil, or multi-layer configurations.

What is claimed is:

1. Method of marking an article for retrospective authentication, comprising the steps of simultaneously:
   a) forming a unique mark including a set of microparticles, each said microparticle having two or more distinguishable layers with the sequence of the layers having an assigned meaning; and
   b) applying the unique mark to an article to be authenticated, said mark being unique as a result of the pattern formed by the spatial relationship of said microparticles and said pattern being determined upon placement of said mark on the article.

2. A method of marking an article for retrospective authentication according to claim 1, wherein said layers are colored.

3. A method according to claim 1 wherein said microparticles have a thermochromic layer.

4. A method according to claim 1 wherein said microparticles have a photochromic layer.

5. A method of marking an article for retrospective authentication according to claim 1, wherein said mark is formed by applying liquid adhesive to the article, said adhesive having microparticles entrained therein, said microparticles forming a unique spatial pattern as said adhesive solidifies on the article.

6. A method of marking an article for retrospective authentication according to claim 5 wherein said adhesive is applied with a brush.

7. A method of marking an article for retrospective authentication according to claim 5 wherein said adhesive is applied with an eye dropper.

8. A method of marking an article for retrospective authentication according to claim 1 wherein said mark is formed by applying an ink to the article, said ink having microparticles entrained therein, said microparticles forming a spatial pattern after said ink is applied to said article as said ink dries.

9. A method according to claim 8 wherein said ink is applied to said article with a writing instrument.

10. A method according to claim 8 wherein said ink is applied to said article with a stamp.

11. A method according to claim 8 wherein said ink is thermochromic.

12. A method according to claim 8 wherein said ink is photochromic.

13. A method according to claim 1 wherein said microparticles are not discernable to the naked eye.

14. A method according to claim 13 wherein said microparticles have a layer of thermochromic material that is transparent within a first temperature range including the temperatures of 60–90 degrees Fahrenheit and are opaque within a second temperature range that excludes the temperatures within the first temperature range, and wherein the method includes the step of exposing said microparticle to a temperature within said second temperature range to reveal the layer's color.

15. A method according to claim 13 wherein said microparticles have a layer of near-infra-red material that is transparent when exposed to light that is not ultra-violet and which flouresces when exposed to ultra-violet light, and wherein the method includes the step of exposing said microparticle to ultra-violet light.

* * * * *